United States Patent Office 3,158,706

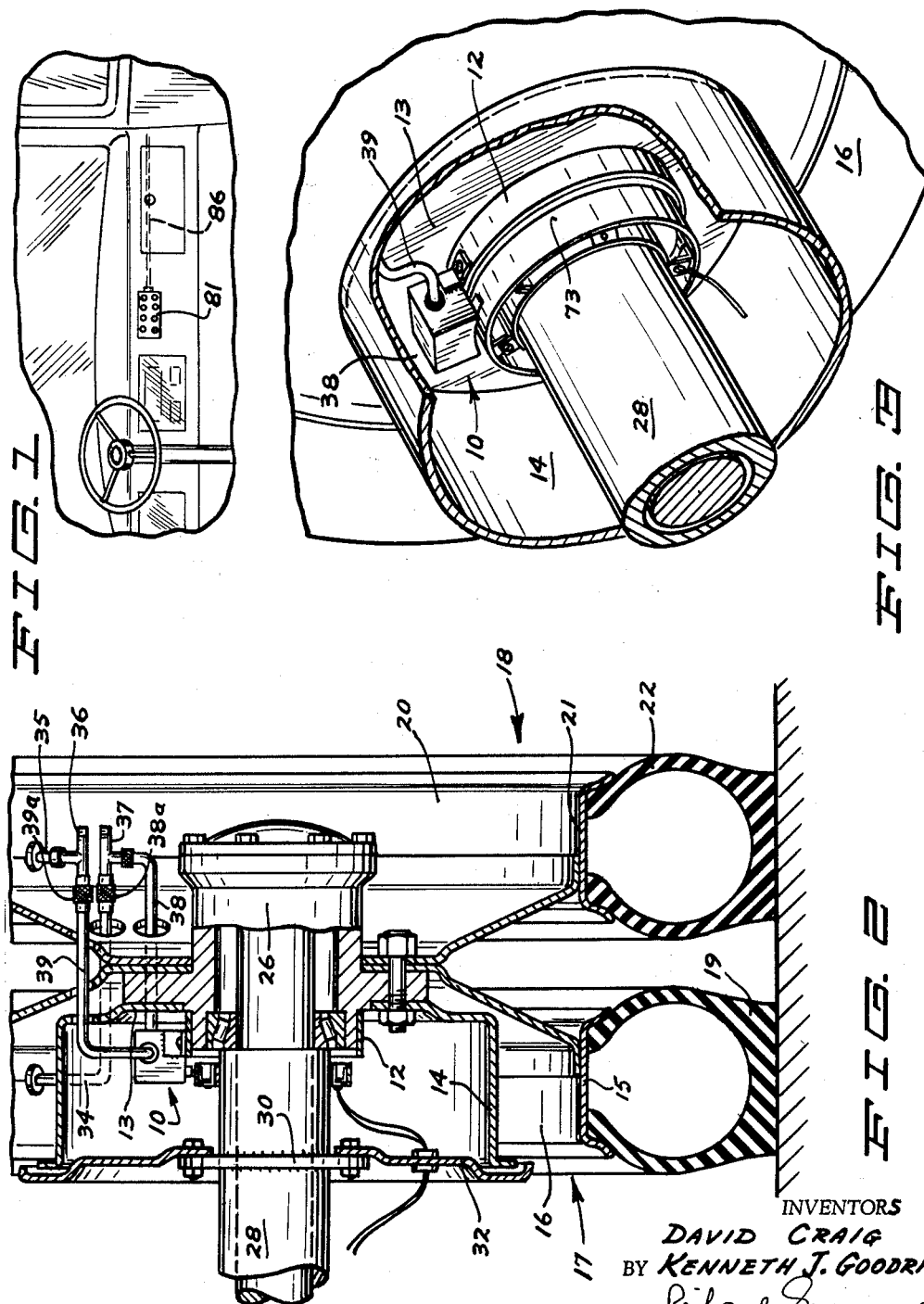

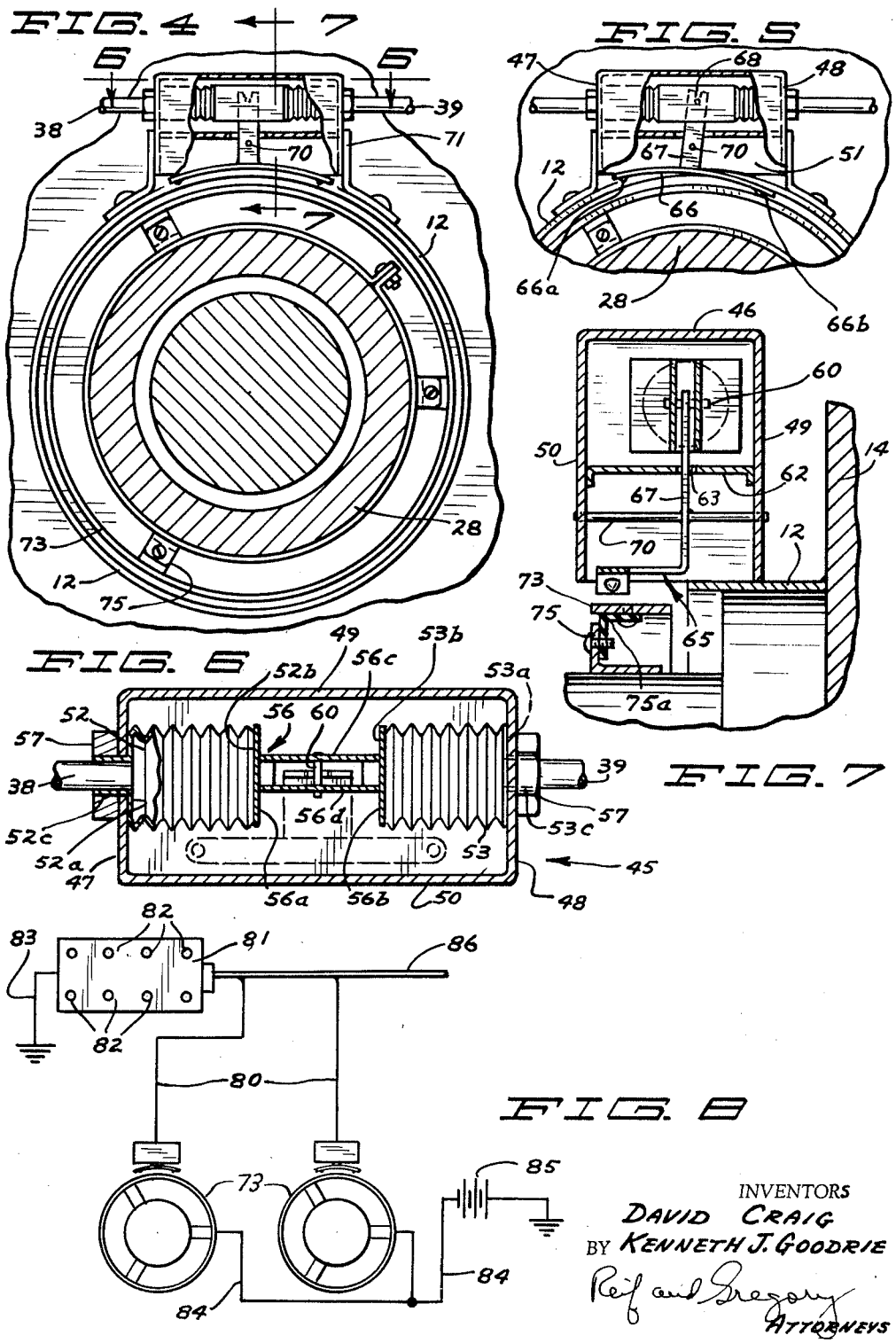

Patented Nov. 24, 1964

1

2

3,158,706
PNEUMATIC TIRE PRESSURE DIFFERENTIAL SENSING DEVICE

David Craig, 3854 Unity Ave. N., and Kenneth J. Goodrie, 5424 Unity Ave. N., both of Minneapolis, Minn.
Filed Oct. 23, 1962, Ser. No. 232,446
3 Claims. (Cl. 200—61.22)

This invention relates to an improvement in a tire pressure sensing device. More particularly, this device is intended for use in connection with pneumatic tires of motor vehicles to indicate to the operator thereof an under inflation condition of a tire. The invention herein represents an improvement over the invention disclosed by the applicants in their application for U.S. Letters Patent, S.N. 135,169, filed August 31, 1961.

Particularly in the use of dual tires in the larger commercial automotive vehicles, it is difficult for the operator to determine whether one of a pair of tires of dual wheels is underinflated. The tires represent a substantial investment and it is desirable to keep them under proper inflation for purpose of safety and for securing the maximum wear and service from a tire.

There are various devices for sensing the air pressure condition of a tire. Many of these fail to operate reliably or at all under adverse weather conditions, such as under conditions where condensation develops within the mechanism of the device and subsequently freezes preventing the operation of the mechanism.

The applicants' device represents a simple and rugged construction adapted to operate efficiently under all operating conditions.

It is an object of this invention therefore to provide a ruggedly constructed tire pressure sensing device adapted for efficient operation under all operating conditions.

It is a further object of this invention to provide a device for sensing pressure in a pair of pneumatic tires comprising means respectively communicating with the pressure of each of said pair of tires to be actuated and to actuate to signal upon a predetermined change of pressure in one of said pair of tires.

These and other objects and advantages of the invention will be fully set forth in the following description made in connection with the accompanying drawings in which like reference characters refer to similar parts throughout the several views and in which:

FIG. 1 is a broken view in perspective indicating a signal panel;

FIG. 2 is a view in vertical section showing applicants' device in operating position;

FIG. 3 is a broken view on an enlarged scale showing a close up view of applicants' device in operating condition;

FIG. 4 is a view of applicants' device in a non-actuating operating position with a portion thereof broken away;

FIG. 5 is a view similar to that in FIG. 4 showing applicants' device in an actuating operating position;

FIG. 6 is a view in horizontal section taken on line 6—6 of FIG. 4 as indicated by the arrows;

FIG. 7 is a view in vertical cross section taken on line 7—7 of FIG. 4 as indicated by the arrows; and FIG. 8 is a schematic view indicating wiring circuits in conection with the invention herein.

Referring to the drawings and more specifically to FIGS. 2 and 3, applicants' device 10 is shown in a preferred operating position on the inner wheel 17 which with wheel 18 forms a pair of dual wheels. Relative to said wheel 18, applicants' device is shown mounted on a ring member 12 secured to the inner wall 13 of a brake drum 14 carried on a disc 16 having a rim 15 thereabout carrying a tire 19. Said wheel 18 comprises a disc 20 having a rim 21 thereabout carrying a tire 22. Said wheels are mounted on a hub 26 journaled on an axle 28 with said axle carrying an annular member or collar 30 to which is secured the disc or closure plate 32 of the brake dum 14. Said pair of wheels are shown coupled together in a conventional manner.

Running from conventional air valves in tires 19 and 22 through the rims 15 and 21 are air lines 34 and 35 carrying T-valve members 36 and 37 adjacent the outer side of wheel 18 for purpose of tire inflation and having respectively coupled thereto by connecting members 38*a* and 39*a*, the air lines 38 and 39 which run to applicants' device as will hereinafter be indicated and which have free communication with the air lines 34 and 35 respectively.

In the specific embodiment here shown, with particular reference to FIGS. 4–7, applicants' device comprises a housing 45 substantially parallelepiped in form having a top 46, end walls 47 and 48, side walls 49 and 50, and an open bottom 51. Disposed in said housing longitudinally thereof and adjacent the top thereof are a pair of bellows 52 and 53 having their respective remote ends 52*a* and 53*a* bearing against the end walls 47 and 48 respectively. The adjacent end walls 52*b* and 53*b* of said bellows are held in an endwise spaced relation by a spacing frame member 56. Said bellows are here shown substantially cylindrical in form and are of a conventional design formed of spring-like metal material and having the capacity to contain an air pressure on the order of 74 pounds per square inch or more. Said bellows are sealed at their adjacent ends and are generally airtight but have their remote ends apertured, as will hereinafter be described.

Said spacing member comprises spaced end portions or plates 56*a* and 56*b* indicated as being rectangular in form and being spaced apart by a pair of vertically disposed parallel plate members 56*c* and 56*d* disposed centrally at right angles between said end plates and being integral therewith. Disposed centrally transversely through said plate members is a pin 60.

Said bellows are under some degree of compression in position bearing against the spacing member 56 therebetween to form in effect an integral operating unit therewith. There is sufficient pressure on the end walls of said housing resulting from the compression of the bellows to hold said bellows and said spacing member very nicely in operating position.

Underlying said bellows and spacing member within said housing is a protective plate member 62 having end flange portions, and said member is very simply frictionally pressed into position.

In connection with said housing is a contact member 65. This member may take various specific forms. With reference to FIG. 5, this contact member is here shown comprising an arcuate plate 66 having contact points 66*a* and 66*b* at either end at the under side thereof. Upstanding centrally of said plate 66 and projecting upwardly through opening 63 in said plate 62 is a right-angled or L-shaped arm 67 having an open-ended notch 68 at its upper end.

Said arm 67 has a pin 70 driven therethrough with the ends of said pin being suitably journaled in the front and rear walls of said housing 45. Said pin 70 is positioned in vertical alignment with said pin 60 to have said arm normally vertically disposed within said housing and having said pin 60 seated within said open-ended notch 68.

Said housing 45 is suitably mounted on said ring 12 being secured thereto by angle brackets 71. Said housing extends forwardly of said ring 12 as does the arcuate plate member 66 carried on the forwardly extended angled portion of said arm 67.

Carried on said axle 28 in alignment with said arcuate plate member 66 to underlie the same is a plate ring or annular member 73 secured to and insulated from said axle by brackets 75 having insulating portions 75a, as indicated in FIG. 7, separating said ring from conductive contact with said axle. Said arcuate plate member 66 will be so spaced from the ring 73 that when said plate member is tilted, as will hereinafter be described, one of the contact points will engage said ring.

The remote ends of said bellows will be formed to have nipples 52c and 53c extending outwardly therefrom and respectively extending through said end walls 47 and 48. Said nipples will be adapted to receive therein the adjacent end portions of said air lines 38 and 39, and friction connectors 57 will hold said lines and nipples respectively in airtight engagement.

The invention herein embraces the concept of having applicants' device mounted on each pair of dual wheels of an automotive vehicle. The wiring system in connection with the installation of applicants' device will be conventional. Referring to FIG. 8, the rings 73 in connection with each pair of dual wheels respectively will be in circuit with the electrical current supply 85 of the motor vehicle by lines 84. Applicants' devices by means of lines 80 running to a harness cable 86 will be in circuit with a signal panel 81, as on the dashboard of the motor vehicle, as indicated in FIG. 1, with the signal lights 82 mounted in said signal panel and respectively being in contact with each of applicants' devices relative to each pair of dual wheels of the motor vehicle. The signal lights will be suitably coded to have reference to specific pairs of tires. Applicants' devices will be suitably grounded, as by lines 83, to the chassis of the vehicle.

*Operation*

For purpose of example, it may be assumed here that an air pressure commonly used in connection with tires on larger sized vehicles is on the order of 75 pounds. Applicants' housing 45 is mounted on the inner wall of the brake drum and will rotate with the wheels. The bellows 52 and 53 within the housing 45 respectively will have communication with the tires 19 and 22 by means of the air lines 38 and 39. Thus the bellows will be equalized relative to the air pressure in the tires and will hold the spacing member 56 therebetween centrally of the housing. In this position the arm 67 will be at right angles relative to the plane of the bellows and the spacing member therebetween and will thus position the arcuate plate member 66 relative to the ring 73 to have the contact points 66a and 66b equally spaced from said ring 73.

The housing 45 and the portions thereof will all be in circuit and will be grounded to the chassis of the vehicle. The ring 73 will be connected to the source of electrical current of the vehicle.

When the pressure in one of the pair of tires is reduced, the pressure in the other of the tires will extend the bellows connected therewith, with the bellows of the deflated tire becoming relatively compressed and shortened due to the decrease of air pressure therein. This relative movement of the bellows will cause a similar movement of the spacing member therebetween with a resulting movement of the arm 67 and a tilting of the plate 66, as indicated in FIG. 5. When the air pressure in the deflated tire is decreased a certain predetermined amount, such as 5 pounds, then the plate member 66 will be tilted sufficiently to have one of its contact points engage the ring 73 and thus close an electrical circuit causing a signal light in the signal panel to become illuminated. The position of the tilted plate will be maintained until the pressure condition of the tire has been corrected. Thus a steady signal is given.

The applicants' device as has been indicated, is constructed of relatively few parts and it is directly and positively responsive to a change in the air pressure of a tire and in calling the attention of the operator of the vehicle to the same by means of a signal light. The applicants' device has been commercially tested and has been found to operate very successfully.

It will of course be understood that various changes may be made in the form, details, arrangement and proportions of the parts, without departing from the scope of applicants' invention which, generally stated, consists in a device capable of carrying out the objects above set forth, in the parts and combinations of parts disclosed and defined in the appended claims.

What is claimed is:

1. A tire pressure sensing device in connection with a pair of pneumatic tires having in combination,
  a housing having a chamber therein,
  a pair of axially aligned spring pressed bellows,
  a member disposed between said bellows spacing the adjacent end portions thereof,
  a plate member, means in said housing suspending said plate member to tilt the same,
  said first mentioned member engaging said means to tilt said plate member responsive to axial movement of said bellows,
  a contact member, said plate member being spaced above said contact member to engage the same upon being tilted, and
  means providing communication between said bellows and said tires respectively for passage of air therebetween.

2. A tire pressure sensing device in connection with a pair of pneumatic tires having in combination,
  a housing having a chamber therein,
  a pair of axially opposed spring pressed bellows in said housing,
  a member disposed between said bellows to space the adjacent end portions thereof,
  means providing communication between said bellows and said tires respectively for the passage of air therebetween,
  a plate member having a central upstanding handle portion,
  means intermediate the ends of said handle portion pivoting the same in said housing, and
  said handle portion having its upper end portion engaging said first mentioned member to be pivoted thereby to tilt said plate member responsive to axial movement of said bellows.

3. A tire pressure sensing device in connection with a pair of pneumatic tires for a vehicle having in combination,
  a housing mounted within a brake drum,
  a stationary insulated ring mounted about the axle of said vehicle adjacent said housing,
  a pair of spring pressed bellows mounted in said housing in opposed endwise relation,
  means providing passage of air between the respective remote ends of said bellows with said tires,
  a frame member spacing the adjacent ends of said bellows and being carried therebetween,
  an arcuate plate member overlying said ring and being spaced therefrom,
  said plate member having spaced contact points for engagement with said ring,
  a handle portion upstanding centrally of said plate member and extending inwardly of said housing,
  means pivotally supporting said handle portion within said housing, and
  means providing swinging engagement between said frame member and said handle portion to pivot said handle portion and tilt said plate member for engagement with said ring responsive to expansion and contraction of said bellows.

References Cited in the file of this patent
UNITED STATES PATENTS
2,874,241    Bardin _____ Feb. 17, 1959